US011144153B2

(12) United States Patent
Strutt et al.

(10) Patent No.: US 11,144,153 B2
(45) Date of Patent: Oct. 12, 2021

(54) USER INTERFACE WITH ACOUSTIC PROXIMITY AND POSITION SENSING ARRANGEMENTS

(71) Applicant: Elliptic Laboratories AS, Oslo (NO)

(72) Inventors: Guenael Thomas Strutt, San Francisco, CA (US); Tom Kavli, Nittedal (NO); Steven Lewis, Cupertino, CA (US)

(73) Assignee: Elliptic Laboratories AS, Oslo (NO)

( * ) Notice: Subject to any disclaimer, the term of this patent is extended or adjusted under 35 U.S.C. 154(b) by 0 days.

(21) Appl. No.: 16/212,321

(22) Filed: Dec. 6, 2018

(65) Prior Publication Data

US 2019/0179476 A1 Jun. 13, 2019

Related U.S. Application Data

(60) Provisional application No. 62/595,886, filed on Dec. 7, 2017.

(51) Int. Cl.
| | | |
|---|---|---|
| *G06F 3/041* | (2006.01) | |
| *G06F 3/043* | (2006.01) | |
| *G06F 3/042* | (2006.01) | |
| *G06F 1/3234* | (2019.01) | |
| *G09G 3/00* | (2006.01) | |

(52) U.S. Cl.
CPC .......... *G06F 3/0416* (2013.01); *G06F 1/3262* (2013.01); *G06F 3/043* (2013.01); *G06F 3/0421* (2013.01); *G06F 2203/04106* (2013.01); *G06F 2203/04108* (2013.01); *G09G 3/002* (2013.01); *G09G 2354/00* (2013.01)

(58) Field of Classification Search
CPC ...... G06F 3/0416; G06F 3/043; G06F 3/0421; G06F 1/3262; G06F 2203/04106; G06F 2203/04108; G09G 3/002; G09G 2354/00
See application file for complete search history.

(56) References Cited

U.S. PATENT DOCUMENTS

| | | | |
|---|---|---|---|
| 2003/0128188 | A1 | 7/2003 | Wilbrink et al. |
| 2007/0159453 | A1 | 7/2007 | Inoue |
| 2014/0192024 | A1 | 7/2014 | Holz |
| 2014/0306889 | A1 | 10/2014 | Kresl et al. |

(Continued)

FOREIGN PATENT DOCUMENTS

| | | |
|---|---|---|
| CN | 105892760 A | 8/2016 |
| WO | WO2009/059479 | 5/2009 |

(Continued)

*Primary Examiner* — Yaron Cohen
(74) *Attorney, Agent, or Firm* — Beyer Law Group LLP

(57) ABSTRACT

A system for detecting a user input to a device comprises a display arrangement (4) arranged to provide a display (20) on a surface. An optical proximity sensing arrangement (6, 8) is configured to produce touch information relating to whether an input object is within a threshold distance of the surface. An acoustic position sensing arrangement (10, 12, 14, and 16) configured to produce position information relating to a position of the input object on the surface. A processing arrangement configured to determine an input to the device from the position information only when it determines from the touch information that the input object is within the threshold distance of the surface.

20 Claims, 13 Drawing Sheets

(56) References Cited

U.S. PATENT DOCUMENTS

| | | | | |
|---|---|---|---|---|
| 2016/0091308 A1* | 3/2016 | Oliaei | ............... | G01B 17/00 367/89 |
| 2016/0139799 A1* | 5/2016 | Lehrian | ............... | G06F 3/04845 715/769 |
| 2017/0031530 A1* | 2/2017 | Ikeda | ............... | H04N 5/74 |

FOREIGN PATENT DOCUMENTS

| WO | WO2009/115799 | 9/2009 |
|---|---|---|
| WO | WO2013/172768 | 11/2013 |

* cited by examiner

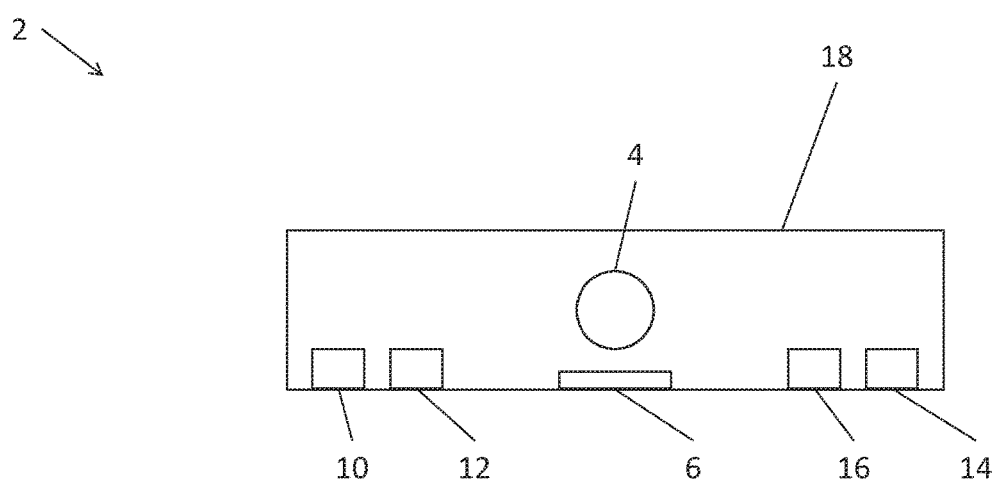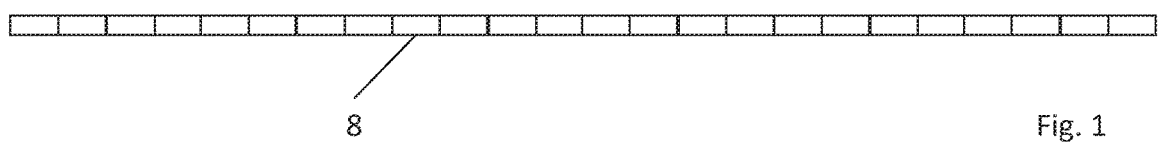
Fig. 1

USER INTERFACE WITH ACOUSTIC PROXIMITY AND POSITION SENSING ARRANGEMENTS

This application claims priority of U.S. Provisional Patent Application No. 62/595,886, filed on Dec. 7, 2017 and which is hereby incorporated by reference in its entirety for all purposes. The present invention relates to user interfaces for controlling electronic or electrical devices.

Many modern electronic devices such as smartphones and tablets are provided with a touchscreen that provides both a display to convey information to a user and an interface that the user can use in order to provide inputs to the device. Such a display may typically be a liquid crystal display (LCD) or a light-emitting-diode (LED) based display provided with a resistive or, more typically with modern devices, a capacitive sensor array that can determine the position of an input object (e.g. a finger or a stylus) as it touches the display.

Such touchscreens can be intuitive, typically presenting a user with a simple interface where they can, for example, press buttons or move sliders presented on the display using their finger or a stylus, so that users can typically use them with minimal instruction or training.

It has also become more common in recent years to provide a wider range of devices, including large electrical appliances such as refrigerators and washing machines, with touchscreens where conventional devices would have had a more rudimentary user interface (e.g. using physical buttons, sliders, dials, etc.), if provided with any such interface at all.

While the manufacturers of such appliances could use LCD or LED-based touchscreens coupled with resistive or capacitive touch sensors of the type used in smartphones, these are not suitable for all applications. Touchscreens may provide high resolution disambiguation and multi-touch detection (i.e. the ability to detect multiple touch inputs, e.g. from different fingers, simultaneously) but are often expensive (e.g. due to the sensing and protective glass layers), significantly increasing the cost of devices that they are built into. Furthermore, touchscreens can take up a considerable amount of physical space on the device, which can put undesirable constraints on the physical construction of the device itself.

In order to mitigate these drawbacks, it has been proposed to provide electronic devices with a "virtual" touchscreen, wherein the display is projected onto a surface (such as a surface of the device or onto an external surface such as onto a table or work surface) and user inputs are captured using a mechanism external to the device, e.g. using a camera to determine where a user's finger is relative to elements of a projected graphical user interface in order to determine a given user input.

One form of such a virtual touchscreen has been proposed in US 2007/0159453 to provide virtual keypads or keyboards for mobile phones and tablets using infrared transmission and detection in order to perform touch sensing without a sensing surface. However, such infrared touch sensors typically use multiple elements. For example, one implementation may involve the use of two arrays of light emitters and light sensors positioned around the display area.

When viewed from a first aspect, the present invention provides a system for detecting a user input to a device, the system comprising:

a display arrangement arranged to provide a display on a surface;

an optical proximity sensing arrangement configured to produce touch information relating to whether an input object is within a threshold distance of the surface;

an acoustic position sensing arrangement configured to produce position information relating to a position of the input object on the surface; and a processing arrangement configured to determine an input to the device from the position information only when it determines from the touch information that the input object is within the threshold distance of the surface.

This first aspect further extends to a method of detecting a user input to a device, the method comprising:

providing a display on a surface;

using an optical proximity sensing arrangement to produce touch information relating to whether an input object is within a threshold distance of the surface;

using an acoustic position sensing arrangement to produce position information relating to a position of the input object on the surface; and determining an input to the device from the position information only when it is determined from the touch information that the input object is within the threshold distance of the surface.

This first aspect of the invention also extends to a non-transitory, computer-readable medium comprising instructions that, when executed on a suitable processor, cause the processor to execute a method of detecting a user input to a device, said method comprising:

providing a display on a surface;

using an optical proximity sensing arrangement to produce touch information relating to whether an input object is within a threshold distance of the surface;

using an acoustic position sensing arrangement to produce position information relating to a position of the input object on the surface; and determining an input to the device from the position information only when it is determined from the touch information that the input object is within the threshold distance of the surface.

Thus it will be appreciated that, in accordance with embodiments of the present invention, there is provided a system for detecting a user input to a device that utilises both optical and acoustic sensors to determine user inputs made with the input object (e.g. a user's finger or a stylus). The optical proximity sensing arrangement may be used to determine the out-of-plane distance in the z-axis (i.e. in a direction normal or orthogonal to the display) of the input object while the acoustic position sensing arrangement may be used to determine the in-plane position of the input object, i.e. in the x- and y-axes of the display.

As the position information is obtained acoustically rather than optically, there is no need to provide the device with a large number of optical sensors—the touch information may, at least in some embodiments, be provided by a single optical sensor. The Applicant has appreciated that acoustic sensors such as ultrasonic sensors do not typically provide sufficient spatial resolution to determine the proximity of the input object to the surface (i.e. in the z-direction) when being used for detecting in-plane positions (i.e. in the x- and y-directions) and thus by combining the use of an optical sensing arrangement to determine whether or not a touch input has occurred and an acoustic sensing arrangement to determine where the touch input took place, the Applicant has appreciated an improved user input device for providing a virtual touchscreen.

While the display arrangement could be a physical display (e.g. an LCD screen or LED display), in some embodiments the display arrangement comprises a projector arranged to project the display onto the surface. By incorporating a projector, it is possible to avoid the need to include a physical display at all, reducing the cost of the display arrangement and relaxing design constraints (e.g. by avoiding the need to provide a space for such a physical display). There are a number of small, low-profile projectors (often referred to as "pico projectors") available that could be used to implement such a projector-based display arrangement, and these may, at least in some arrangements, be preferred as they take up minimal space which may be advantageous for certain applications.

As explained above, the system determines an input from the position information only if it first determines that the input object is within the threshold distance of the surface, i.e. the input object must be close enough to the surface for the system to determine that the user is attempting to provide an input before determining where the input is taking place. In set of embodiments, the acoustic position sensing arrangement is operated in a first mode if the processing arrangement determines from the touch information that the input object is within the threshold distance of the surface but is operated in a second mode if the processing arrangement does not determine from the touch information that the input object is within the threshold distance of the surface, wherein the second mode consumes less power than the first mode. The implementation of the low-power second mode will depend on the type of acoustic sensor being used, however in some arrangements, operating the acoustic position sensing arrangement in the second mode results in the acoustic position sensing arrangement transmitting acoustic signals (e.g. ultrasonic signals) less frequently than in the first mode, i.e. the transmission rate of the acoustic signals is reduced.

In some such embodiments, the acoustic position sensing arrangement is disabled in the second mode. The Applicant has appreciated that, in accordance with such embodiments, the system may conserve power by enabling the acoustic position sensing arrangement only when it is determined that the user is attempting to provide an input.

However, in embodiments where the acoustic position sensing arrangement remains enabled but in a low-power second mode, the acoustic proximity sensing arrangement may be arranged to determine whether a user is within a second threshold distance of the surface. This second threshold distance may typically be much greater than the threshold distance from the surface that the input object must be within in order to determine a user input to the device. In some such embodiments, the system is arranged to disable the display arrangement unless a user is detected within the second threshold distance. For example, if a refrigerator located in a user's kitchen were provided with a system in accordance with such embodiments, the display (e.g. a projected GUI) may be disabled until the user walks into the kitchen, at which point it may be enabled.

Additionally or alternatively, in some embodiments the system further comprises a tap sensor arranged to determine when the input object comes into physical contact with the surface from one or more surface vibrations produced when the input object comes into physical contact with the surface. This tap sensor may, by way of example only, comprise a microphone that 'listens' for a tapping sound (i.e. the surface vibrations) made by the input object as it comes into contact with the surface. Those skilled in the art will appreciate that the surface vibrations may not necessarily be audible to a human user.

The tap sensor may be a separate transducer (such as a microphone) or it may be the same acoustic transducer used for other acoustic position sensing. For example the same transducer may be used both for time-of-flight position sensing techniques and contact sensing (i.e. listening for tapping sounds). The tap sensor may comprise a plurality of transducers. The acoustic position sensing arrangement may have a separate tap sensing mode, or the acoustic position sensing arrangement may be arranged always to listen for taps.

In some such embodiments, the tap sensor is attached to the surface such that at least some of the surface vibrations due to the input object coming into contact with the surface are received by the tap sensor. However, the tap sensor does not necessarily need to be in contact with the surface to perceive the tap, and in an alternative set of embodiments, the tap sensor is acoustically coupled to the surface.

In some embodiments, the system is operable in an active mode and in a power-saving mode, wherein the system is arranged to switch from the power-saving mode to the active mode when the tap sensor determines that the input device has come into contact with the surface. Those skilled in the art will appreciate that, in accordance with such embodiments, a tap sound may be used to "wake up" the system from the power-saving mode. Additionally or alternatively, the tap sound may, in some embodiments, be used to activate one or more further operational modes of the system.

In a potentially overlapping set of embodiments, the system is arranged to disable optical proximity sensing arrangement unless a user is detected within a third threshold distance. The third threshold distance may be different to the second threshold distance or these may be the same—for example, the optical touch sensing arrangement may be enabled before or after the display is enabled as the user approaches the surface, however in preferred embodiments the third threshold distance is less than the second threshold distance. Thus, in a particularly preferred set of embodiments, the system may be arranged such that the acoustic sensing arrangement is operated in a low-power mode wherein it only checks for presence of a user in the vicinity of the surface. Once a user is detected, the display may be enabled and the optical proximity sensing arrangement may subsequently be enabled as the user gets closer to the surface. Finally once the input object is within the first threshold distance (i.e. out-of-plane), the acoustic position sensing arrangement is switched to its first mode such that the (in-plane) position of the input object can be determined. In a set of embodiments in which the system comprises a tap sensor as outlined hereinabove, the system may be configured to switch the acoustic position sensing arrangement to the first mode when the tap sensor determines that the input device has come into contact with the surface.

In some embodiments, the optical proximity sensing arrangement comprises a laser source arranged to project a beam and a light sensor arranged to detect whether or not the beam is broken. Those skilled in the art will appreciate that, in accordance with such embodiments, the touch information will be indicative that the input object is within the threshold distance of the surface if the laser beam is broken. In some embodiments, the laser source is arranged to project the beam through a lens such that the width of the beam is increased. This lens is preferably a cylindrical lens or a Fresnel lens. In a preferred set of such embodiments, the width of the beam is at least as large as the display. If the beam is at least as wide as the display, the input object can be detected at all positions on the display, assuming that the length of the beam is greater than or equal to the length of the display (which is typically true, particularly if the beam is parallel to the surface).

Typically, a user input device in accordance with embodiments of the present invention is arranged to provide inputs to an external electronic device, for example a computer or a home appliance such as a refrigerator, a washing machine, a central heating system etc. In some embodiments, the system comprises a communication interface arranged to communicate the input to an external device. In some embodiments, the communication interface comprises a wired interface. However, in some potentially overlapping embodiments this communication interface comprises a wireless communication interface and is arranged to transmit the input using at least one protocol selected from the group comprising: Bluetooth®; Bluetooth® Smart; ZigBee®; Wi-Fi®; and WiMAX™.

In some embodiments, the acoustic position sensing arrangement comprises an ultrasonic sensor comprising at least one ultrasonic transmitter arranged to transmit ultrasonic signals and at least one ultrasonic receiver arranged to receive said transmitted ultrasonic signals reflected by the input object. In some such embodiments, the acoustic position sensing arrangement comprises a plurality of ultrasonic receivers, wherein the acoustic position sensing arrangement determines the position of the input object based on a difference in time of flight of ultrasonic signals received by the plurality of ultrasonic receivers corresponding to the same ultrasonic signal transmitted by the ultrasonic transmitter.

As described previously hereinabove, in some embodiments, the system is arranged to detect the presence of a user. In some such embodiments, the acoustic position sensing arrangement is arranged to detect the presence of the user. This may be achieved, at least in some embodiments, by transmitting one or more ultrasonic probe signals into a local environment around the system, receiving one or more reflections of the ultrasonic probe signals, and determining from said reflected ultrasonic probe signals if the user is present. In some such embodiments, the system compares one or more properties (e.g. amplitude, round-trip time-of-flight, spectral profile, phase, etc.) of the reflected ultrasonic probe signals with one or more templates to determine if the user is present. These templates may be indicative of the user being present or of the user not being present. Detecting the presence of a user may have a number of benefits. For example, the system may be arranged to increase a brightness of the display upon detecting the user's presence. Alternatively, the system may operate in a low power mode unless a user is detected in order to reduce power consumption and processing requirements.

It will be appreciated by those skilled in the art that the input object may typically be a user's finger or a stylus, however other objects may also be used as an input object. In some embodiments however, the system is configured to ignore objects other than the input object. In some such embodiments, the optical proximity sensing arrangement is configured to ignore objects other than the input object. For example, the input object may have certain optical properties, for example its tendency to absorb or reflect incident infra-red radiation, where the optical proximity sensing arrangement can determine whether or not an object in its vicinity is likely to be the input object based on this prior knowledge. Alternatively, the optical proximity sensing arrangement may be able to determine from the size of an object proximate to the display that it is too small or too large to be the input object, or may determine from the shape of such an object that it is not the input object.

In some potentially overlapping embodiments, the acoustic position sensing arrangement is configured to ignore objects other than the input object. Similarly, the input object may have certain acoustic properties, for example its tendency to absorb or reflect incident ultrasonic signals based on their frequency, where the acoustic position sensing arrangement can determine whether or not an object in its vicinity is likely to be the input object from the spectral profile of received reflected ultrasonic signals.

In some embodiments a size of the display is user-configurable. In some such embodiments, a sensitive area of the optical proximity sensing arrangement and/or a sensitive area of the acoustic position sensing arrangement are variable. In accordance with such embodiments, the system can ensure that user inputs are only detected within the display (or a region of the display or in a region beyond the boundaries of the display) by setting the size of the sensitive area(s) appropriately. The respective sizes of the sensitive areas of the optical and acoustic position sensing arrangements are ideally substantially the same but it will be appreciated that they may be different to one another.

The Applicant has appreciated that, in addition to the acoustic position sensing arrangement(s) described hereinabove, optical time-of-flight (TOF) based position sensing arrangements may also be advantageous. Therefore, in some embodiments, the system comprises an optical position sensing arrangement configured to:

transmit an optical signal;

receive a reflection of said optical signal; and produce additional position information relating to the position of the input object on the surface from a time difference between said transmission of the optical signal and said reception of the reflection of the optical signal;

wherein the processing arrangement is configured to determine the input to the device from both the position information produced by the acoustic position sensing arrangement and the additional position information produced by the optical position sensing arrangement.

In some embodiments, the system comprises a plurality of optical position sensing arrangements. Each of the plurality of optical position sensing arrangements may be located at different positions and/or be orientated at different angles to one another within the system. This may provide improvements to the resolution and/or ability to detect the size and shape of objects placed within the vicinity of the optical sensing arrangements.

While the system could be integrated into a larger device or appliance (e.g. a refrigerator or an oven), in some embodiments, the system is a standalone device. In some such embodiments the system is housed in a common housing. The Applicant has appreciated that such a standalone device may be "retrofitted" to existing electronic and/or electrical appliances without having to redesign them. In accordance with such embodiments, the system may provide a virtual touchscreen for a wider array of applications, for example such a standalone device could have a mode in which it provides a virtual touchscreen input for a conventional refrigerator (e.g. to set its temperature or to switch an ice dispenser from producing ice cubes to crushed ice) that can be enabled when the user places the device on or near the refrigerator and a second mode in which it provides a virtual touchscreen projected onto a wall, where the virtual touchscreen provides a user with the ability to control the central heating in their house.

The use of optical time-of-flight based sensors to determine the position of the input object used for a virtual touchscreen is novel and inventive in its own right and thus, when viewed from a second aspect, the present invention provides a system for detecting a user input to a device, the system comprising:

a display arrangement arranged to provide a display on a surface;

an optical proximity sensing arrangement configured to produce touch information relating to whether an input object is within a threshold distance of the surface;

a first optical position sensing arrangement configured to: transmit a first optical signal; receive a reflection of said first optical signal; and produce first position information relating to a position of the input object on the surface from a time difference between said transmission of the first optical signal and said reception of the reflection of the first optical signal;

a second optical position sensing arrangement configured to: transmit a second optical signal; receive a reflection of said second optical signal; and produce second position information relating to the position of the input object on the surface from a time difference between said transmission of the second optical signal and said reception of the reflection of the second optical signal; and a processing arrangement configured to determine an input to the device from the first position information and the second position information only when the processing arrangement determines from the touch information that the input object is within the threshold distance of the surface.

This second aspect further extends to a method of detecting a user input to a device, the method comprising:

providing a display on a surface;

using an optical proximity sensing arrangement to produce touch information relating to whether an input object is within a threshold distance of the surface;

using a first optical position sensing arrangement to transmit a first optical signal; receive a reflection of said first optical signal; and produce first position information relating to a position of the input object on the surface from a time difference between said transmission of the first optical signal and said reception of the reflection of the first optical signal;

using a second optical position sensing arrangement to transmit a second optical signal; receive a reflection of said second optical signal; and produce second position information relating to the position of the input object on the surface from a time difference between said transmission of the second optical signal and said reception of the reflection of the second optical signal; and determining an input to the device from the first position information and second position information only when it is determined from the touch information that the input object is within the threshold distance of the surface.

This second aspect of the invention also extends to a non-transitory, computer-readable medium comprising instructions that, when executed on a suitable processor, cause the processor to execute a method of detecting a user input to a device, said method comprising:

providing a display on a surface;

using an optical proximity sensing arrangement to produce touch information relating to whether an input object is within a threshold distance of the surface;

using a first optical position sensing arrangement to transmit a first optical signal; receive a reflection of said first optical signal; and produce first position information relating to a position of the input object on the surface from a time difference between said transmission of the first optical signal and said reception of the reflection of the first optical signal;

using a second optical position sensing arrangement to transmit a second optical signal; receive a reflection of said second optical signal; and produce second position information relating to the position of the input object on the surface from a time difference between said transmission of the second optical signal and said reception of the reflection of the second optical signal; and determining an input to the device from the first position information and second position information only when it is determined from the touch information that the input object is within the threshold distance of the surface.

Those skilled in the art will appreciate that, in accordance with embodiments of this second aspect of the invention, there is provided a user input device that uses at least two optical position sensing arrangements to determine the position of an input object relative to the surface only if it is first determined that the input object is sufficiently close to the surface as described previously with reference to the first aspect of the invention.

It will be appreciated the optional technical features described with reference to embodiments of the first aspect of the invention are equally applicable, where appropriate, to the second aspect of the invention.

When viewed from a third aspect, the present invention provides a system for detecting a user input to a device, the system comprising:

a display arrangement arranged to provide a display on a surface;

an acoustic proximity sensing arrangement configured to produce touch information relating to whether an input object is within a threshold distance of the surface;

an acoustic position sensing arrangement configured to produce position information relating to a position of the input object on the surface; and a processing arrangement configured to determine an input to the device from the position information only when the processing arrangement determines from the touch information that the input object is within the threshold distance of the surface.

This third aspect further extends to a method of detecting a user input to a device, the method comprising:

providing a display on a surface;

using an acoustic proximity sensing arrangement to produce touch information relating to whether an input object is within a threshold distance of the surface;

using an acoustic position sensing arrangement to produce position information relating to a position of the input object on the surface; and determining an input to the device from the position information only when it is determined from the touch information that the input object is within the threshold distance of the surface.

This third aspect of the invention also extends to a non-transitory, computer-readable medium comprising instructions that, when executed on a suitable processor, cause the processor to execute a method of detecting a user input to a device, said method comprising:

providing a display on a surface;

using an acoustic proximity sensing arrangement to produce touch information relating to whether an input object is within a threshold distance of the surface;

using an acoustic position sensing arrangement to produce position information relating to a position of the input object on the surface; and determining an input to the device from the position information only when it is determined from the touch information that the input object is within the threshold distance of the surface.

Those skilled in the art will appreciate, in accordance with embodiments of the third aspect of the invention, acoustic sensing techniques may be used both for the detection of a touch event on the surface as well as the position of the touch on the surface.

In some embodiments of the third aspect, the acoustic position sensing arrangement and the acoustic proximity sensing unit share at least one ultrasonic transmitter and at least one ultrasonic receiver, wherein the device is arranged such that:

the at least one ultrasonic transmitter transmits ultrasonic signals; and the at least one ultrasonic receiver receives reflections of said transmitted ultrasonic signals, said reflections having been reflected by the input object;

wherein the device is further arranged to determine distance and direction information from the reflected ultrasonic signals received at the at least one ultrasonic receiver.

The device may have one transmitter and two or more receivers. Alternatively it may have one receiver and two or more transmitters. Further alternatively it may have two or more transmitters and two or more receivers.

The distance information may be used to determine both the touch information and the position information. In some embodiments, the distance information is determined from a transfer function between the transmitted ultrasonic signals and the received reflections of these ultrasonic signals. For example, the relative amplitude of received reflections may be indicative of a distance to the input object. This distance information may be used to determine whether the input object is close enough to the surface to determine that a touch event has occurred. The transmitted ultrasonic signals may be coded, for example one or more chirps, such that specific received reflections can be attributed to the correct transmitted signal of which they are a reflection.

In some such embodiments, the device is arranged to determine the direction information from a phase difference between the reflected ultrasonic signals received at the first and second ultrasonic receivers. This phase difference may provide an indication of the relative angle of the input object with respect to the acoustic position sensing arrangement. By combining this direction information with the distance information, the device may be able to determine the position of the input object.

In some embodiments, the first and second ultrasonic receivers are physically separated by an odd multiple of half-wavelengths, said half-wavelengths being half of the wavelength of the transmitted ultrasonic signals. For example, if the ultrasonic signals are transmitted at 40 kHz, the ultrasonic receivers (which may, for example, be microphones) may be separated by 4 mm. By spacing the ultrasonic receivers in this way, signal processing techniques such as beam-forming may be facilitated.

It will be appreciated the optional technical features described with reference to embodiments of the first or second aspects of the invention are equally applicable, where appropriate, to the third aspect of the invention.

Certain embodiments of the present invention will now be described with reference to the accompanying drawings, in which:

FIG. 1 is a schematic diagram of a user input device in accordance with an embodiment of the present invention;

Figure 2:
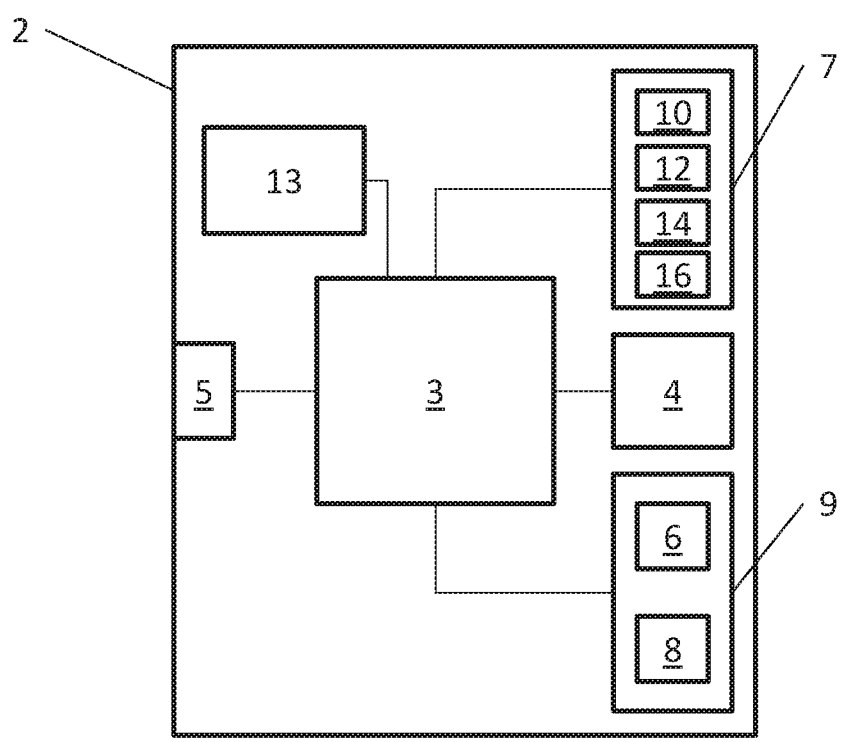
FIG. 2 is a block diagram of the components of the user input device of FIG. 1.

FIG. 1 is a schematic diagram of a user input device 2 in accordance with an embodiment of the present invention. The user input device 2 comprises: a projector 4; a laser source 6; a light sensor array 8; a first ultrasonic transmitter 10; a first ultrasonic receiver 12; a second ultrasonic transmitter 14; and a second ultrasonic receiver 16. The light sensor array 8 is a separate part to the other components, which are all within a common housing 18 in FIG. 1, however in other arrangements, such as the one shown in FIG. 4, the components 2, 4, 6, 8, 10, 12, 14, 16 could be provided in a single integrated unit. The respective functions of these various components are described in detail hereinbelow.

While in this particular embodiment there are two ultrasonic transmitters 10, 14 and two ultrasonic receivers 12, 16, it will be appreciated that, in general, it is possible to implement the present invention using an arrangement of just two transmitters and one receiver or an arrangement of just two receivers and one transmitter. Examples of these are described below with reference to FIGS. 12 and 13.

FIG. 2 is a block diagram of the components of the user input device 2 of FIG. 1. As can be seen from the block diagram, as well as the components 2, 4, 6, 8, 10, 12, 14, 16 described previously with reference to FIG. 1, the user input device 2 further comprises a processor 3, a video interface 5, and a communication interface 13. The ultrasonic transmitters 10, 14 and ultrasonic receivers 12, 16 are grouped into an acoustic position sensing arrangement 7 for ease of reference. Similarly, the laser source 6 and the light sensor array 8 are grouped into an optical touch sensing arrangement 9.

The communication interface 13 is arranged to transmit inputs detected by the user input device 2 to one or more external devices. This interface 13 provides both a wired interface and a wireless communication interface that can communicate using at least one of: Bluetooth®; Bluetooth® Smart; ZigBee®; Wi-Fi®; and WiMAX™.

The projector 4 is typically a small, lightweight projector such as a "pico projector" and is arranged to project a display 20 onto a surface, such as onto a table, a floor, a wall, or a surface of an appliance such as a fridge door—some of these examples are described in further detail hereinbelow. The projector 4 is typically arranged to receive video data from an external source such as a computer, a microcontroller, a system-on-chip, etc. via the video interface 5 and convert this to a visible display 20 that a user can see. Examples of suitable pico projectors include the Yoga™ Tablet 2 Pro made by Lenovo® or the Moto Insta Share Projector, also made by Lenovo®.

Figure 3:
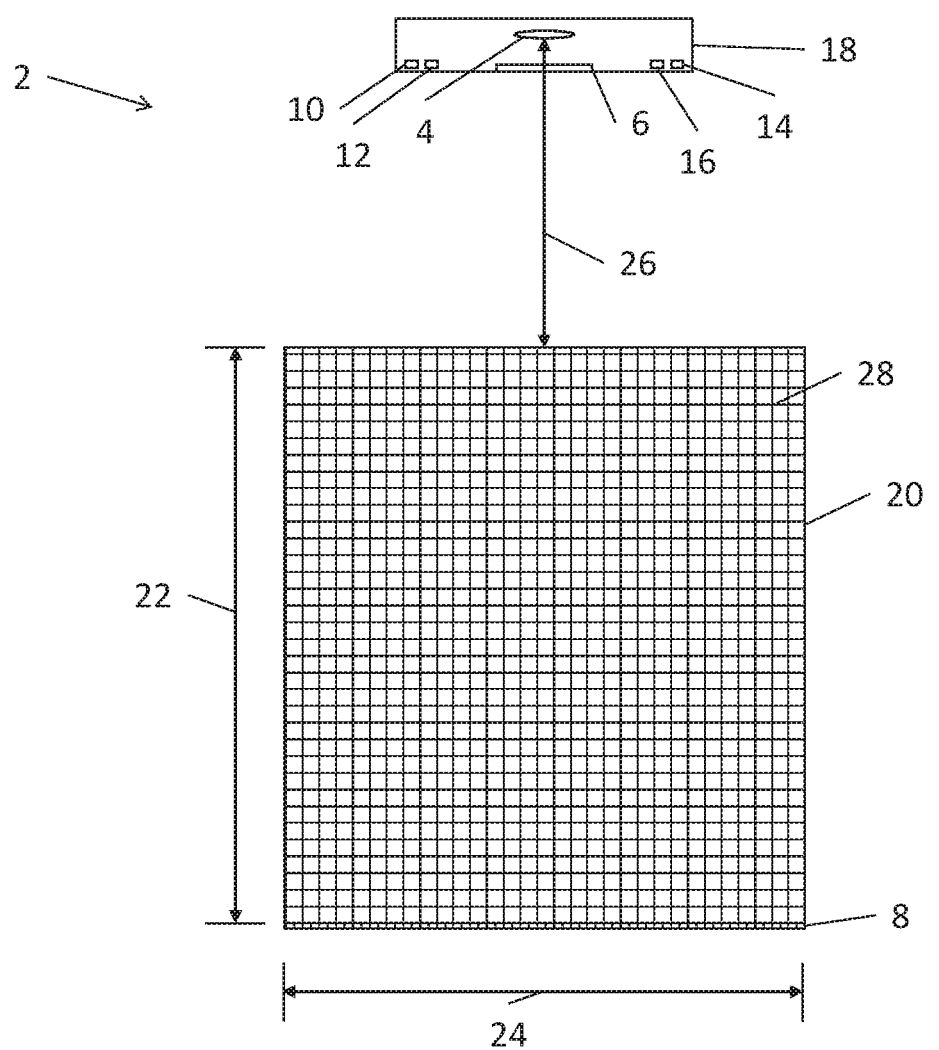
FIG. 3 is an overhead view of a virtual touchscreen projected by the user input device of FIG. 1.

Such a display 20 can be seen in FIG. 3 which provides an overhead view of a virtual touchscreen projected by the user input device 2 of FIG. 1. The display 20 has a length 22 and a width 24 and is projected at a distance 26 from the projector 4. The display 20 is divided into a grid of elements 28 in which a user can provide inputs, wherein the grid of elements 28 may have a different resolution to the display itself (i.e. the number of pixels displayed may differ from the number of unique positions at which an input object may be detected).

Figure 4:
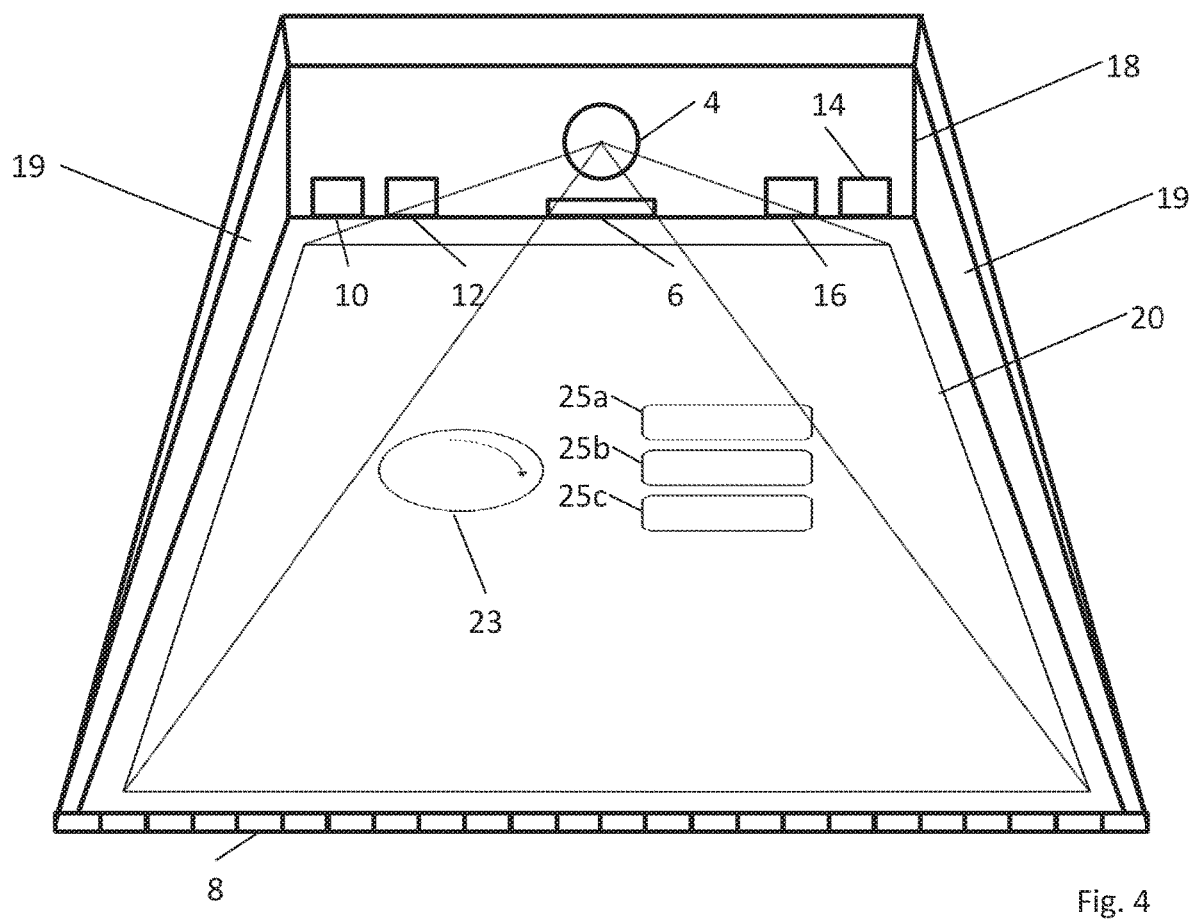
FIG. 4 is a perspective view of the user input device of FIG. 1 in use.

FIG. 4 is a perspective view of the user input device 2 of FIG. 1 in use. In this case, the light sensor array 8 is joined to the housing 18 by a pair of side arms 19 such that the user input device 2 forms a single integrated unit. These side arms 19 may, in some arrangements, be removable such that a user can place the light sensor array 8 at a suitable location for a given application. In other arrangements, for example where the user input device 2 is to be integrated into another device such as an oven, the connection between the housing 18 and the light sensor array 8 may be permanent.

As can be seen in FIG. 4, the projector 4 projects the display 20 onto a surface 21, where the display 20 in this case includes a graphical user interface (GUI) including a dial 23 and three buttons 25a-c. The user may interact with each of these elements, for example by pressing one or more of the 'buttons' 25a-c and/or by rotating the 'dial' 23 as will be explained below.

Figure 5:
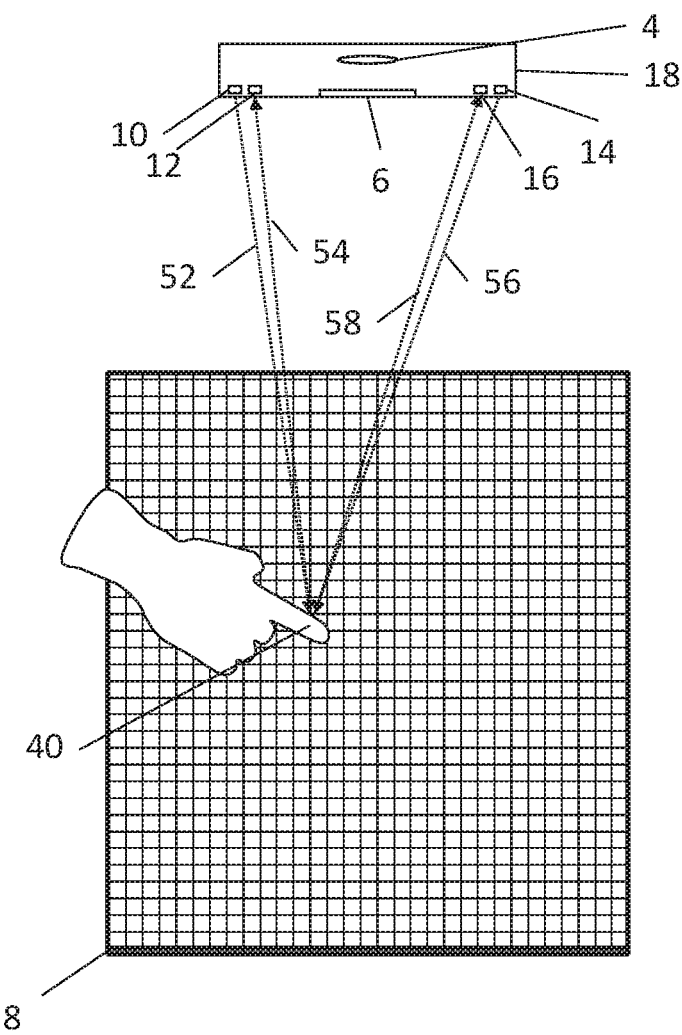
FIG. 5 is an overhead view showing the acoustic position sensing arrangement.

FIG. 5 is an overhead view of the acoustic position sensing arrangement used by the user input device 2 of FIG. 1. As described above, the user input device 2 of FIG. 5 comprises a pair of ultrasonic TOF position sensors: a first ultrasonic transmitter 10 and receiver 12 that form a first ultrasonic sensor; and a second ultrasonic transmitter 14 and receiver 16 that form a second sensor.

Once a touch event has been detected by the optical touch sensor 9 (i.e. the infrared laser 6 and light sensor array 8), the first ultrasonic transmitter 10 emits a first ultrasonic signal 52 which is reflected by an object touching the surface 21, so that the first ultrasonic receiver 12 receives a first reflected ultrasonic signal 54. Similarly, the second ultrasonic transmitter 14 emits a second ultrasonic signal 56 after the touch event is detected, which second ultrasonic signal 56 is reflected by the object and the second ultrasonic receiver 16 thus receives a second reflected ultrasonic signal 58. Based on the round-trip TOF of each of these, a distance from each of the ultrasonic TOF position sensors to the object, in this case the user's finger 40, can be calculated, e.g. using ellipse intersection in two dimensions as described in the Applicant's earlier publication WO 2009/115799 A1.

The processor 3 may then determine the position of the user's finger 40 from the position information, i.e. the data relating to the round-trip TOF obtained by each sensor. This determined position may then be analysed to determine a user input, for example whether a user has touched one of the 'buttons' 25a-c or rotated the 'dial' 23 described above with reference to FIG. 4.

Figure 6:
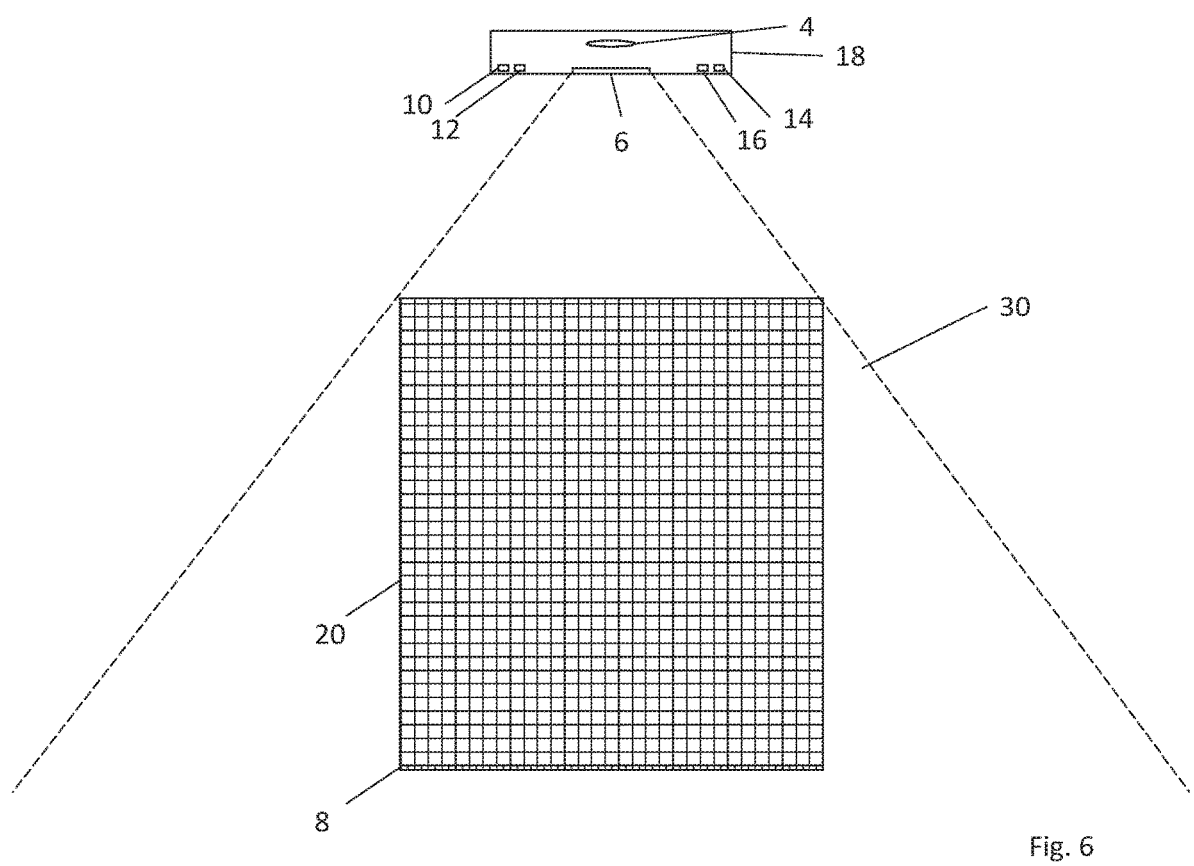
FIG. 6 is a further overhead view showing a beam used by the optical touch sensing arrangement.
Figure 7:
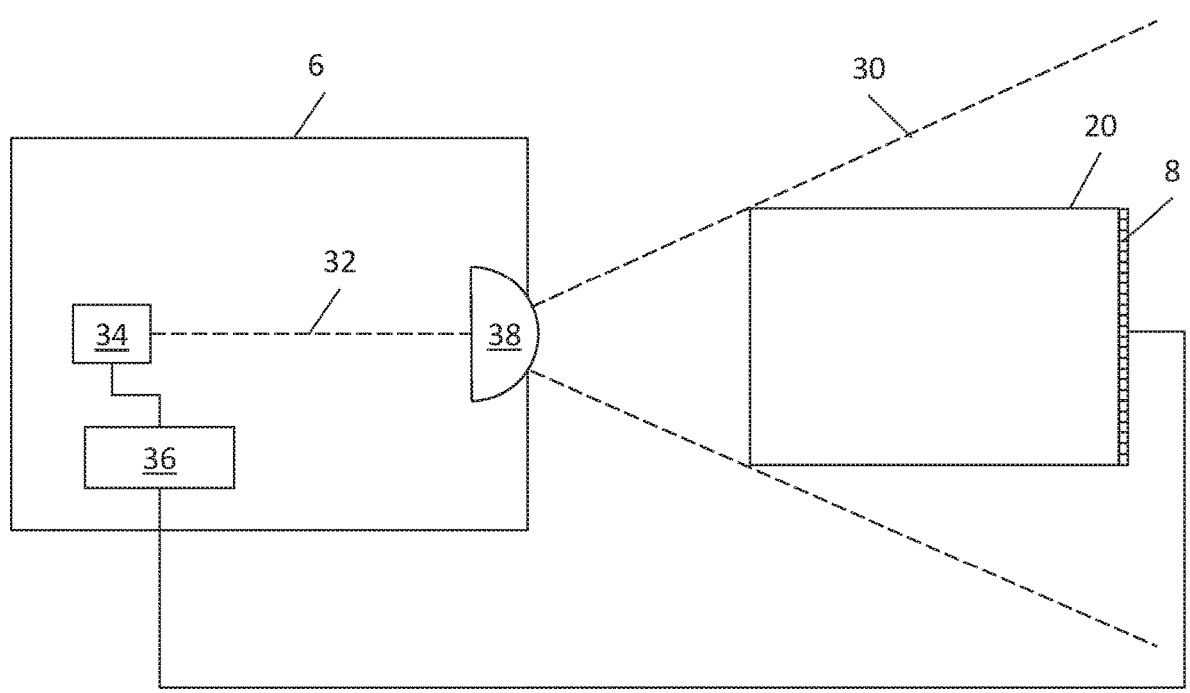
FIG. 7 is a block diagram of the optical touch sensing arrangement.

FIG. 6 is a further overhead view showing a beam used by the optical touch sensing arrangement comprising the laser source 6 and the light sensor array 8. The laser source 6 is arranged to project an infrared laser beam 30 over the display 20 in the direction of the light sensor array 8. As can be seen in FIG. 7, which is a block diagram of the optical touch sensing arrangement, this laser beam 30 originates as a point laser beam 32 produced by a laser module 34 operated by a controller 36. This point laser beam 32 passes through a semi-circular (i.e. convex) cylindrical lens 38 which spreads the light of the initial beam 32 into a line or sheet which exits the laser source 6 as the beam 30 discussed above.

Figure 8:
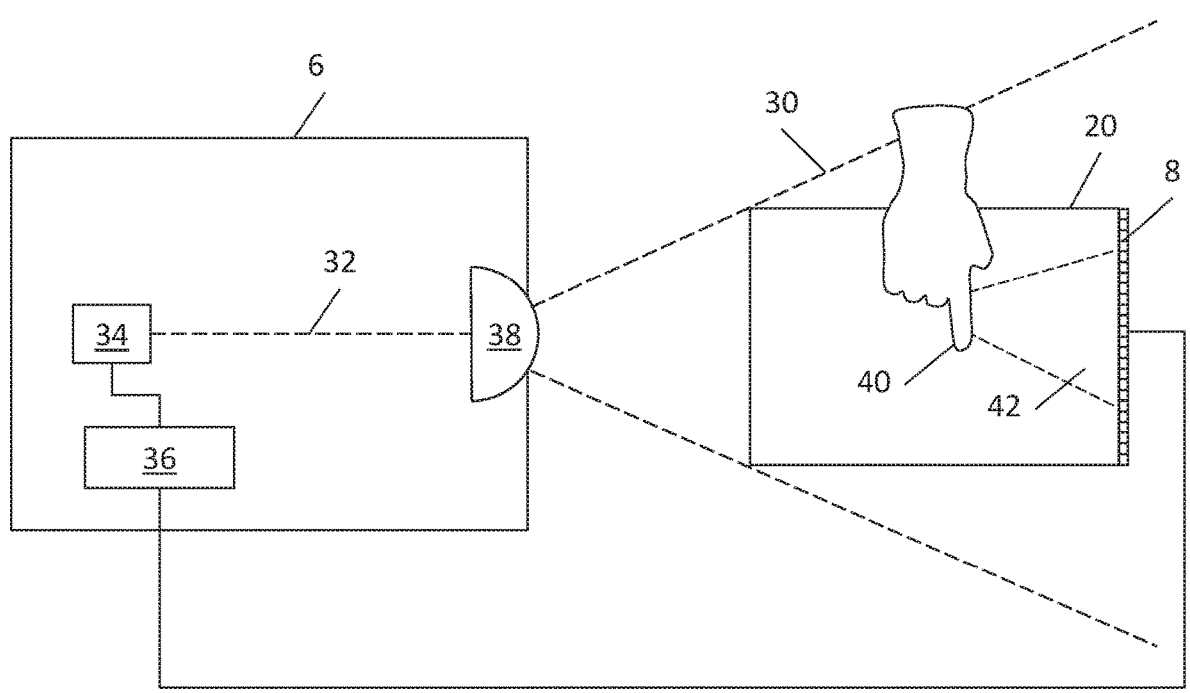
FIG. 8 is a further block diagram illustrating the optical touch sensing arrangement detecting when a user touches the display.

If a user wishes to make an input using their finger 40, they may approach the surface on which the display 20 is projected with their finger 40. As they approach the surface, their finger 40 will interrupt at least a portion of the infrared laser sheet 30 as shown in FIG. 8. This results in a region 42 in which no laser light exists as it has been blocked by the user's finger 40. This results in a number of elements within the light sensor array 8 that do not receive any infrared radiation and so report back to the controller 36 that something has broken the beam 30, indicating that the user may have touched the surface. The controller 36 may then relay this to the processor 3 in order to inform the processor that a touch has occurred.

In this arrangement, the beam of light 30 covers the entire extent of the projected display 20 and the array of light sensors 8 are at least as wide as the width 24 of the display such that a touch at any point on the display may be detected. However, it will be appreciated that the light sensor array 8 could be shorter or wider than the display, either reducing the touch space or increasing it beyond the display respectively.

The processor 3 and/or the controller 36 may determine the number of light sensors within the array 8 that were blocked and determine from this the size of the object that blocked the infrared beam 30. The processor 3 may then decide whether the touch was a valid touch or whether it was an erroneous input (for example if a user accidentally walked into the display) based on this determined size. Once it is determined that a valid touch event has occurred, the user input device 2 may determine the position of the touch as described previously with reference to FIG. 5.

Figure 9:
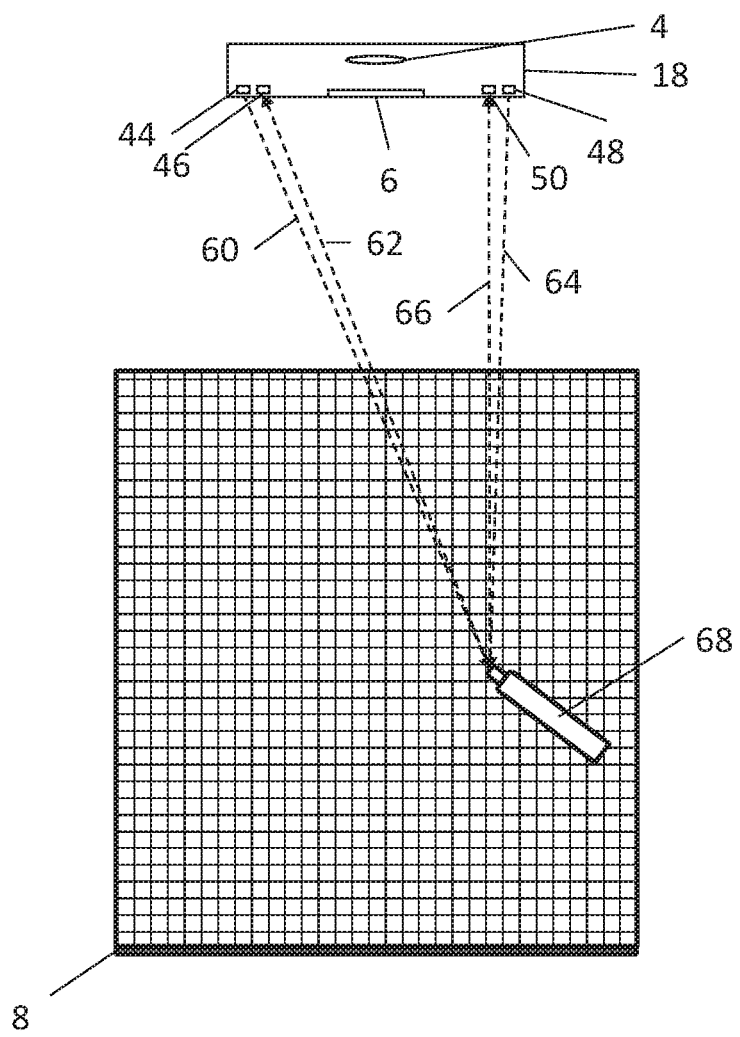
FIG. 9 is an overhead view of an optical position sensing arrangement in accordance with another embodiment of the present invention.

FIG. 9 is an overhead view of an optical position sensing arrangement in accordance with another embodiment of the present invention. An alternative user input device 2' is shown in FIG. 1, where like reference numerals indicate like components to those describe previously. However, unlike the user input device 2 described above, the user input device 2' of FIG. 5 comprises a pair of infrared TOF distance sensors: a first infrared transmitter 44 and receiver 46 that form a first sensor; and a second infrared transmitter 48 and receiver 50 that form a second sensor.

Once a touch event has been detected by the optical touch sensor (i.e. the infrared laser 6' and light sensor array 8'), the first infrared transmitter 44 emits a first infrared signal 60 which is reflected by an object touching the surface 21. The first infrared receiver 46 thus receives a first reflected infrared signal 62. Similarly, the second infrared transmitter 48 emits a second infrared signal 64 after the touch event is detected, which second infrared signal 64 is reflected by the object and the second infrared receiver 50 receives the resulting second reflected infrared signal 66. Based on the round-trip TOF of each of these, a distance from each of the infrared TOF position sensors to the object, in this case a stylus 68, can be calculated. The processor 3 may then determine the position of the stylus 68 from the position information, i.e. the data relating to the round-trip TOF obtained by each sensor.

Those skilled in the art will appreciate that one or more of these infrared TOF position sensors may be combined with one or more ultrasonic position sensors as described previously.

Figure 10:
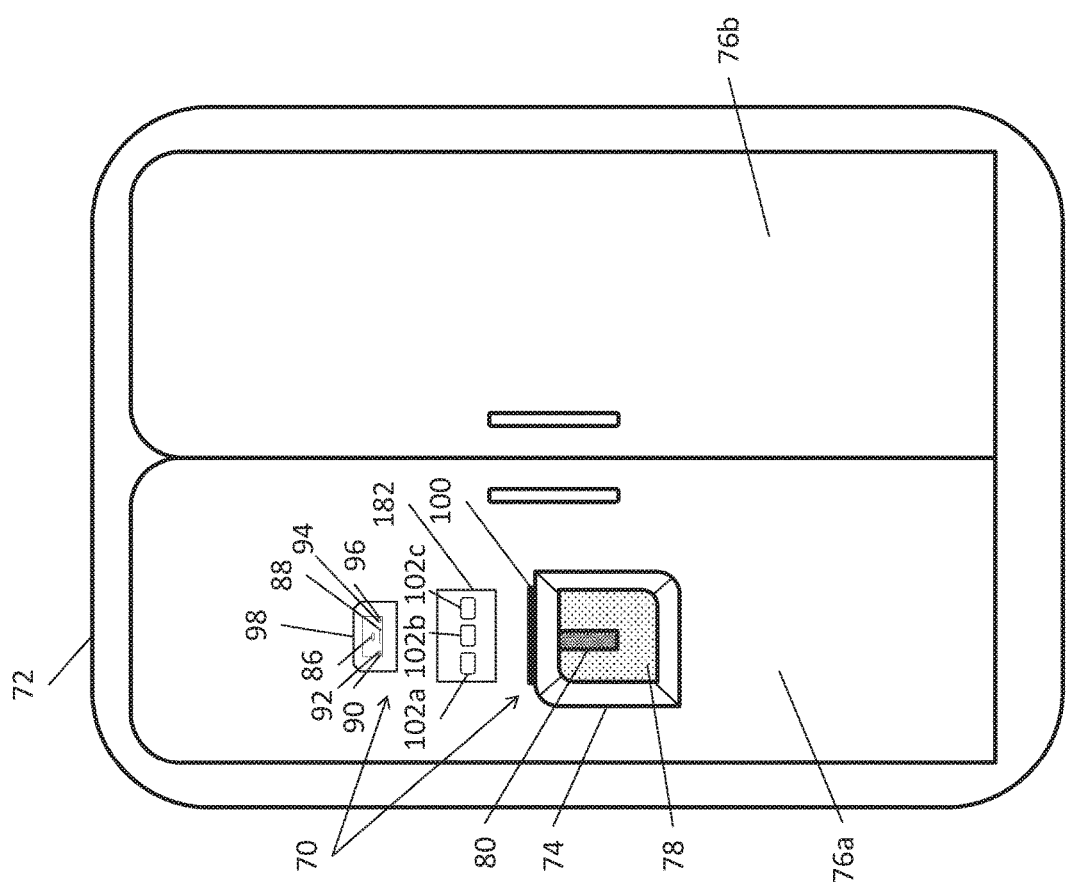
FIG. 10 is a schematic diagram of a user input device integrated into a refrigerator in accordance with a further embodiment of the present invention.

FIG. 10 is a schematic diagram of a user input device 70 integrated into a refrigerator 72 in accordance with a further embodiment of the present invention. The refrigerator 72 has a combined chilled water and ice dispenser 74 located on one 76a of the refrigerator doors 76a, 76b. A user can obtain chilled water, ice cubes, or crushed ice by placing a vessel such as a glass into a cavity 78 of the dispenser 74 and pushing the glass against a lever 80 at the back of the cavity 78.

In order to select between the different modes (i.e. between chilled water, ice cubes, and crushed ice), the user input device 70 provides the user with a virtual touchscreen display 82 projected onto the fridge door 76a. A housing 84 containing a projector 86; a laser source 88; a first ultrasonic transmitter 90; a first ultrasonic receiver 92; a second ultrasonic transmitter 94; and a second ultrasonic receiver 96 is located within a door housing 98 such that all of these components of the user input device 70 are hidden from view. A light sensor array 100 is embedded within a recess at the top of the dispenser 74 so it is also hidden from view.

The projector 86 projects the display 82 vertically downwards onto the door and presents the user with a GUI containing three buttons 102a-c that the user can press to change the mode of the dispenser 74. As the user places their finger on the section of the door 76a covered by the display 82, the optical touch sensor formed by the laser source 88 and the light sensor array 100 detects the touch and activates the ultrasonic position sensing arrangement (i.e. the first ultrasonic transmitter 90; the first ultrasonic receiver 92; the second ultrasonic transmitter 94; and the second ultrasonic receiver 96), which is otherwise in a low power mode in order to reduce power consumption.

When in the low power mode, the ultrasonic position sensing arrangement periodically transmits an ultrasonic probe signal intermittently less often (i.e. with a longer period) than when it is determining the position of an input object. Any reflected signals received are compared to a stored signal by the processor (e.g. the processor 3 describe previously) indicative of the room the refrigerator 72 is in having no users present. If the processor determines that there is a difference between the received reflection of the ultrasonic probe signal and the stored signal and that this difference is indicative of a human being present, it may enable the projector 86 which may otherwise be disabled in order to reduce power consumption.

Figure 11:
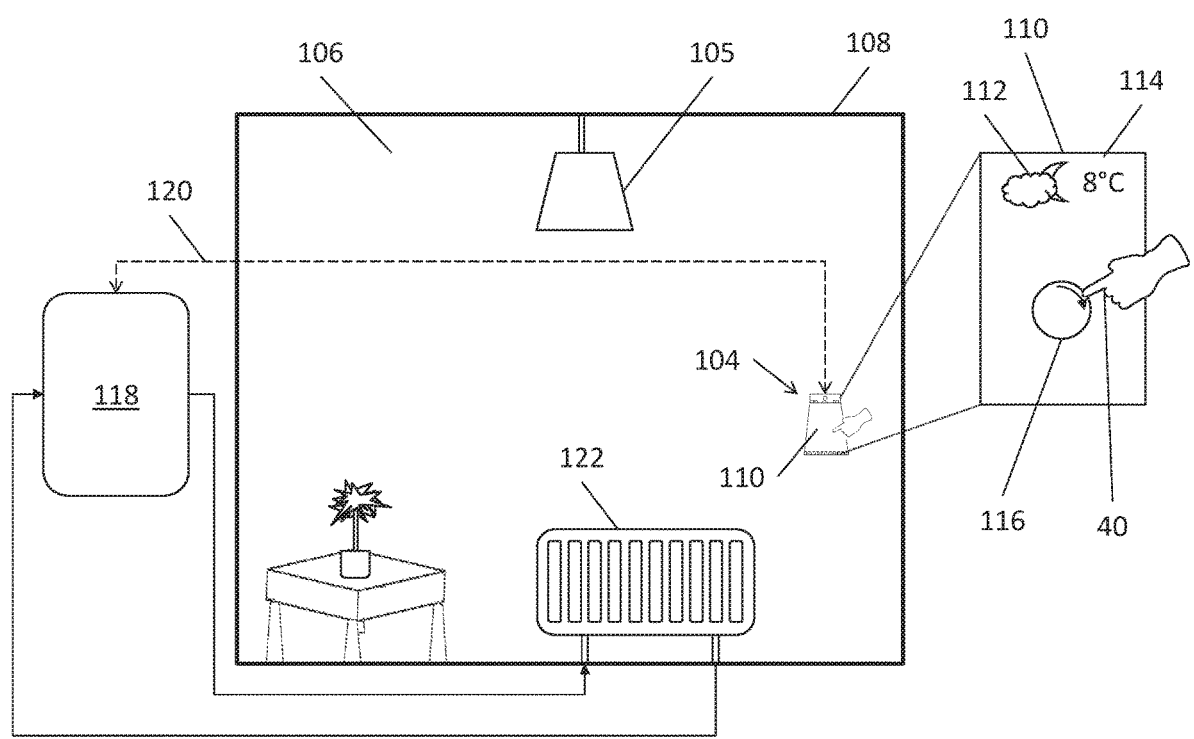
FIG. 11 shows a standalone user input device being used in accordance with a yet further embodiment of the present invention.

FIG. 11 shows a standalone user input device 104 being used in accordance with a yet further embodiment of the present invention. The standalone user input device 104 is not integrated into any particular appliance but is instead mounted onto a wall 106 of a room 108, e.g. in the user's house. The user input device 104 may be used to provide different GUIs for different home automation controls, for example to control the brightness or colour of the lighting 105 in the room. In this example, the user input device 104 provides a virtual touchscreen display 110 for controlling the central heating within the room 108.

The display 110 shows the current weather 112 and temperature 114 and provides the user with a temperature dial 116 suitable for setting the desired temperature of the room 108. The user can use their finger 40 to rotate the dial 116 in order to set a desired temperature for the room. Once the optical touch sensing arrangement determines that the user's finger 40 is touching the display 110, the position sensing arrangement (i.e. the acoustic and/or optical position sensing arrangements described previously) may track the movement of the finger 40 in order to determine whether the user is turning the dial clockwise (to increase the temperature) or anticlockwise (to decrease the temperature).

Once the user removes their finger 40 from the display 110 (such that the optical touch sensing arrangement determines that the beam is no longer broken), it may communicate the new desired temperature to a boiler 118 using a wireless connection 120 facilitated by the communication interface 13. This wireless communication interface 13 carries out the wireless communication using, by way of example only, Bluetooth®; Bluetooth® Smart; ZigBee®; Wi-Fi®; and/or WiMAX™.

The boiler 118 receives this input from the user input device 104 and begins to circulate hot water through a radiator 122 in the room in order to increase the temperature until it reaches the desired temperature input by the user.

While in the examples described above with reference to FIGS. 10 and 11, the projector projects the display onto a vertical surface (i.e. the door of the refrigerator or a wall), it will be appreciated that it may also be applied to horizontal surfaces (such as a table-top, a workbench, a floor, etc.) or onto surfaces at other angles or that form complex shapes.

Figure 12:
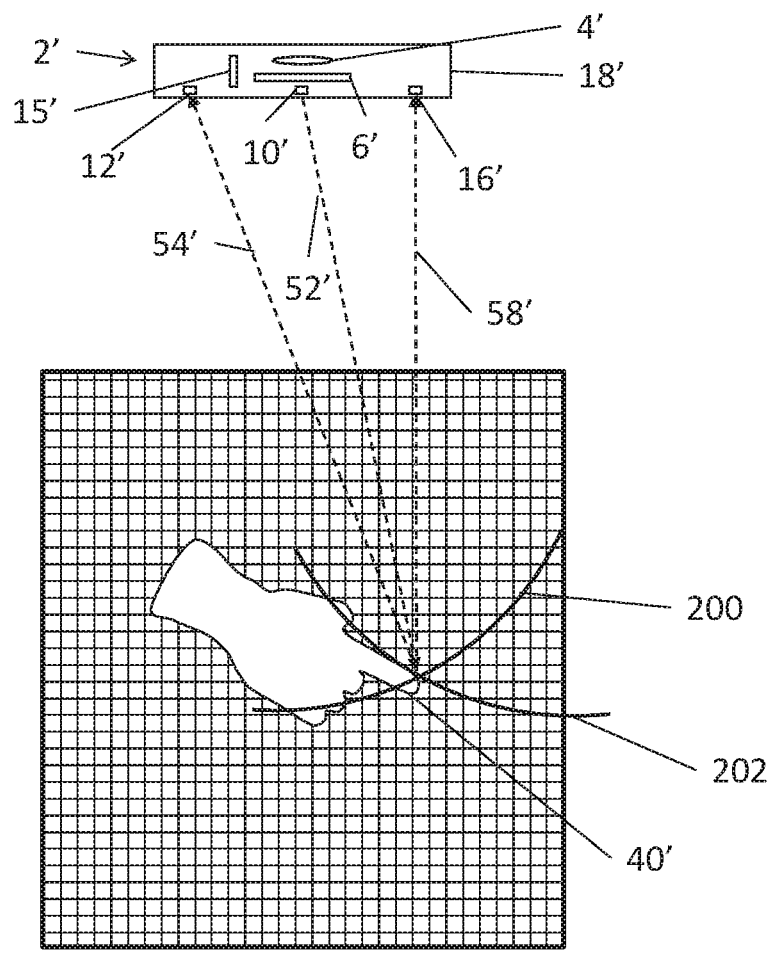
FIG. 12 is a schematic diagram of a user input device in accordance with a further embodiment that uses one ultrasonic transmitter and two ultrasonic receivers.

FIG. 12 is a schematic diagram of a user input device 2' in accordance with a further embodiment that uses one ultrasonic transmitter 10' and two ultrasonic receivers 12', 16', where like reference numerals indicate like components. In this embodiment, the array of light sensors 8 is replaced with a single infrared TOF distance sensor 15' arranged to determine when a touch event occurs. This embodiment is particularly advantageous as it can be constructed using a minimal number of physical components.

It will be appreciated that this infrared TOF distance sensor 15' could readily be used in place of the arrangement using the laser source 6 and the light sensor array 8 in the embodiments described hereinabove.

The infrared TOF distance sensor 15' emits an infrared beam and, based on the speed of light which is known, can resolve the distance to an object from the round-trip TOF. This is typically a cheaper option than the array of light sensors 8 described previously with reference to the user input device 2 of FIG. 1. If the detected distance to a nearby object is less than a certain threshold, the device 2' determines that a touch event has taken place.

Following a touch event being detected by the optical touch sensing arrangement, the transmitter 10' transmits an ultrasonic signal 52' which is reflected by the user's finger 40'. This results in a reflected ultrasonic signal which is received as a first received ultrasonic signal 54' at the first ultrasonic receiver 12' and as a second received ultrasonic signal 58' at the second ultrasonic receiver 16'.

Depending on the position of the finger 40', the first received ultrasonic signal 54' will be received at the first ultrasonic receiver 12' at a different time to the second received ultrasonic signal 58' received at the second ultrasonic receiver 16'. This timing difference is thus indicative of the position of the user's finger 40'.

The processor may then determine the position of the user's finger 40 from the round-trip TOF associated with each received ultrasonic signal 54', 58' using ellipse intersection as is well known per se in the art.

More particularly based on the time taken for the transmitted ultrasonic signal 52' to reach the finger 40' and for the resulting reflected signal 54' to reach the first receiver 12', the processor can determine that the user's finger 40' lies along a first ellipse segment locus 200, which corresponds to the points at which the finger 40' could be that would result in that particular total flight time (i.e. it is an equidistance curve).

Similarly, based on the time taken for the transmitted ultrasonic signal 52' to reach the finger 40' and for the resulting reflected signal 58' to reach the second receiver 16', the processor can determine that the user's finger 40' also lies along a second ellipse segment locus 202. The point at which the loci 200, 202 cross corresponds to the position of the user's finger 40'.

Figure 13:
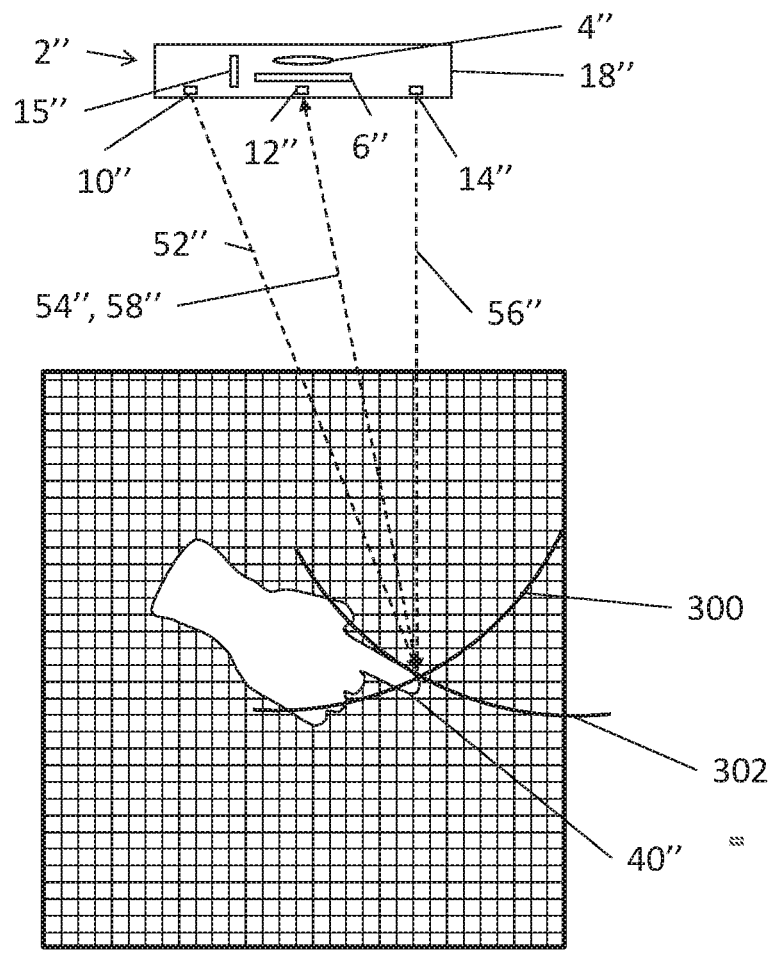
FIG. 13 is a schematic diagram of a user input device in accordance with a further embodiment that uses two ultrasonic transmitters and one ultrasonic receiver.

FIG. 13 is a schematic diagram of a user input device 2" in accordance with a further embodiment that uses two ultrasonic transmitters 10", 14" and one ultrasonic receiver 12", where like reference numerals indicate like components.

Following a touch event being detected by the optical touch sensing arrangement, the first transmitter 10" transmits a first ultrasonic signal 52" and the second transmitter 14" transmits a second ultrasonic signal 56", where each of these transmitted signals 52", 56" are reflected by the user's finger 40". The two transmitted signals 52", 56" can be distinguished from one another, e.g. by having them at different frequencies, by being sent at different time intervals, or by employing difference chirp patterns for each signal.

Each of these transmitted signals 52", 56" results in a respective reflected ultrasonic signal 54", 58" which are received as a first received ultrasonic signal 54" and as a second received ultrasonic signal 58" at the ultrasonic receiver 12".

Based on the time taken for the first transmitted ultrasonic signal 52" to reach the finger 40" and for the resulting reflected signals 54" to reach the receiver 12", the processor can determine that the user's finger 40" lies along a first ellipse segment locus 300, which corresponds to the points at which the finger 40" could be that would result in that particular total flight time (i.e. it is an equidistance curve).

Similarly, based on the time taken for the second transmitted ultrasonic signal 56" to reach the finger 40' and for the resulting reflected signal 58" to reach the receiver 12", the processor can determine that the user's finger 40" also lies along a second ellipse segment locus 302. The point at which these loci 300, 302 cross corresponds to the position of the user's finger 40".

Thus it will be appreciated that embodiments of the present invention provide an improved user input device that uses both optical and acoustic sensors to determine whether a user input has occurred and where such an input has occurred respectively. Other embodiments of the present invention utilise multiple optical, preferably infrared, time-of-flight sensors to determine the position of an input object. It will be appreciated by those skilled in the art that the embodiments described herein are merely exemplary and are not limiting on the scope of the invention.

The invention claimed is:

1. A system for detecting a user input to a device, the system comprising:
a display arrangement arranged to provide a display on a surface;
an acoustic proximity sensing arrangement configured to produce out-of-plane touch information relating to whether an input object is within a threshold distance of the surface in a z-direction;
an acoustic position sensing arrangement configured to produce in-plane position information relating to a position of the input object on the surface in an x-direction and a y-direction; and
a processing arrangement configured to determine an input to the device from the in-plane position information only when the processing arrangement determines from the out-of-plane touch information that the input object is within the threshold distance of the surface, wherein the acoustic position sensing arrangement is operated in a first mode if the processing arrangement determines from the touch information that the input object is within the threshold distance of the surface but is operated in a second mode if the processing arrangement does not determine from the touch information that the input object is within the threshold distance of the surface, wherein the acoustic position sensing arrangement remains enabled in the second mode, wherein the second mode consumes less power than the first mode.

2. The system as claimed in claim 1, wherein the display arrangement comprises a projector arranged to project the display onto the surface.

3. The system as claimed in claim 1, wherein the acoustic proximity sensing arrangement is arranged to determine whether a user is within a second threshold distance of the surface.

4. The system as claimed in claim 3, arranged to disable the display arrangement unless a user is detected within the second threshold distance.

5. The system as claimed in claim 1, further comprising a tap sensor attached or acoustically coupled to the surface and arranged to determine when the input object comes into physical contact with the surface from one or more surface vibrations produced when the input object comes into physical contact with the surface.

6. The system as claimed in claim 5, operable in an active mode and in a power-saving mode, wherein the system is arranged to switch from the power-saving mode to the active mode when the tap sensor determines that the input device has come into contact with the surface.

7. The system as claimed in claim 1, arranged such that the acoustic sensing arrangement is operable in a low-power mode wherein it only checks for presence of a user in the vicinity of the surface.

8. The system as claimed in claim 1, further comprising a communication interface arranged to communicate the input to an external device.

9. The system as claimed in claim 1, wherein the acoustic position sensing arrangement comprises an ultrasonic sensor comprising at least one ultrasonic transmitter arranged to transmit ultrasonic signals and at least one ultrasonic receiver arranged to receive said transmitted ultrasonic signals reflected by the input object.

10. The system as claimed in claim 9, wherein the acoustic position sensing arrangement comprises a plurality of ultrasonic receivers and is arranged to determine the position of the input object based on a difference in time of flight of ultrasonic signals received by the plurality of ultrasonic receivers corresponding to the same ultrasonic signal transmitted by the ultrasonic transmitter.

11. The system as claimed in claim 9, wherein the acoustic position sensing arrangement is arranged to detect the presence of the user.

12. The system as claimed in claim 11, arranged to:
transmit one or more ultrasonic probe signals into a local environment around the system;
receive one or more reflections of the ultrasonic probe signals; and
determine from said reflected ultrasonic probe signals if the user is present.

13. The system as claimed in claim 12, arranged to compare one or more properties of the reflected ultrasonic probe signals with one or more templates to determine if the user is present.

14. The system as claimed in claim 1, configured to ignore objects other than the input object.

15. The system as claimed in claim 1, further comprising an optical position sensing arrangement configured to:
transmit an optical signal;
receive a reflection of said optical signal; and
produce additional position information relating to the position of the input object on the surface from a time difference between said transmission of the optical signal and said reception of the reflection of the optical signal;
wherein the processing arrangement is configured to determine the input to the device from both the position information produced by the acoustic position sensing arrangement and the additional position information produced by the optical position sensing arrangement.

16. The system as claimed in claim 1, wherein the system is housed in a common housing.

17. The system as claimed in claim 1, wherein a size of the display is user-configurable.

18. A method of detecting a user input to a device, the method comprising:
providing a display on a surface;
using an acoustic proximity sensing arrangement to produce out-of-plane touch information relating to whether an input object is within a threshold distance of the surface in a z-direction;
using an acoustic position sensing arrangement to produce in-plane position information relating to a position of the input object on the surface in an x-direction and a y-direction; and
determining an input to the device from the in-plane position information only when it is determined from the out-of-plane touch information that the input object is within the threshold distance of the surface,
wherein the acoustic position sensing arrangement is operated in a first mode if the processing arrangement determines from the touch information that the input object is within the threshold distance of the surface but is operated in a second mode if the processing arrangement does not determine from the touch information that the input object is within the threshold distance of the surface, wherein the acoustic position sensing arrangement remains enabled in the second mode, wherein the second mode consumes less power than the first mode.

19. A system for detecting a user input to a device, the system comprising:
a display arrangement arranged to provide a display on a surface;
an acoustic proximity sensing arrangement configured to produce out-of-plane touch information relating to whether an input object is within a threshold distance of the surface in a z-direction;
an acoustic position sensing arrangement configured to produce in-plane position information relating to a position of the input object on the surface in an x-direction and a y-direction; and
a processing arrangement configured to determine an input to the device from the in-plane position information only when the processing arrangement determines from the out-of-plane touch information that the input object is within the threshold distance of the surface,
wherein the acoustic proximity sensing arrangement is arranged to determine whether a user is within a second threshold distance of the surface, wherein the acoustic proximity sensing arrangement is arranged to disable the display arrangement unless a user is detected within the second threshold distance, wherein the second threshold distance is greater than the threshold distance.

20. A method of detecting a user input to a device, the method comprising:
providing a display on a surface;
using an acoustic proximity sensing arrangement to produce out-of-plane touch information relating to whether an input object is within a threshold distance of the surface in a z-direction;
using an acoustic position sensing arrangement to produce in-plane position information relating to a position of the input object on the surface in an x-direction and a y-direction;
determining an input to the device from the in-plane position information only when it is determined from the out-of-plane touch information that the input object is within the threshold distance of the surface; and
using the acoustic proximity sensing arrangement to determine whether a user is within a second threshold distance of the surface, wherein the acoustic proximity sensing arrangement is arranged to disable the display arrangement unless a user is detected within the second threshold distance, wherein the second threshold distance is greater than the threshold distance.

* * * * *